United States Patent [19]
Engerman

[11] Patent Number: 5,813,169
[45] Date of Patent: Sep. 29, 1998

[54] PORTABLE GREENHOUSE CONSTRUCTION

[76] Inventor: Deanna L. Engerman, 13033 Brookside Dr. NE., Aurora, Oreg. 97002

[21] Appl. No.: 846,555

[22] Filed: Apr. 29, 1997

[51] Int. Cl.⁶ ..................................................... A01G 9/00
[52] U.S. Cl. ...................................................... 47/17; 47/28
[58] Field of Search .................................. 47/17, 29, 58, 47/60; 52/63, 64, 66

[56] References Cited

U.S. PATENT DOCUMENTS

| | | | |
|---|---|---|---|
| 3,800,468 | 4/1974 | de Graff | 47/28 |
| 4,304,068 | 12/1981 | Beder | 47/17 |
| 4,387,533 | 6/1983 | Green et al. | 47/17 |
| 5,038,517 | 8/1991 | Talbott | 47/17 |
| 5,216,834 | 6/1993 | Crowley | 47/17 |
| 5,479,744 | 1/1996 | Meyer | 52/63 |

*Primary Examiner*—Michael J. Carone
*Assistant Examiner*—Robert Pezzuto

[57] ABSTRACT

A new portable greenhouse construction for providing seasonal or year round gardens. The inventive device includes a floor, side walls, end walls, and a roof defining an enclosure. Ballast containers are connected to the base of the end walls and side walls for stabilizing the greenhouse on the ground when filled with a ballast material, such as water. The roof is arch shaped and includes a pair of retractable, translucent covers which are rolled up onto a shaft to permit fresh air into the interior of the greenhouse through a mesh screen. Weighted rods are disposed at the edge of each cover to bias the covers to a position covering the mesh screen when the covers are unrolled from the shaft. The greenhouse includes an integral floor with a drain therein for draining moisture from the greenhouse.

17 Claims, 3 Drawing Sheets

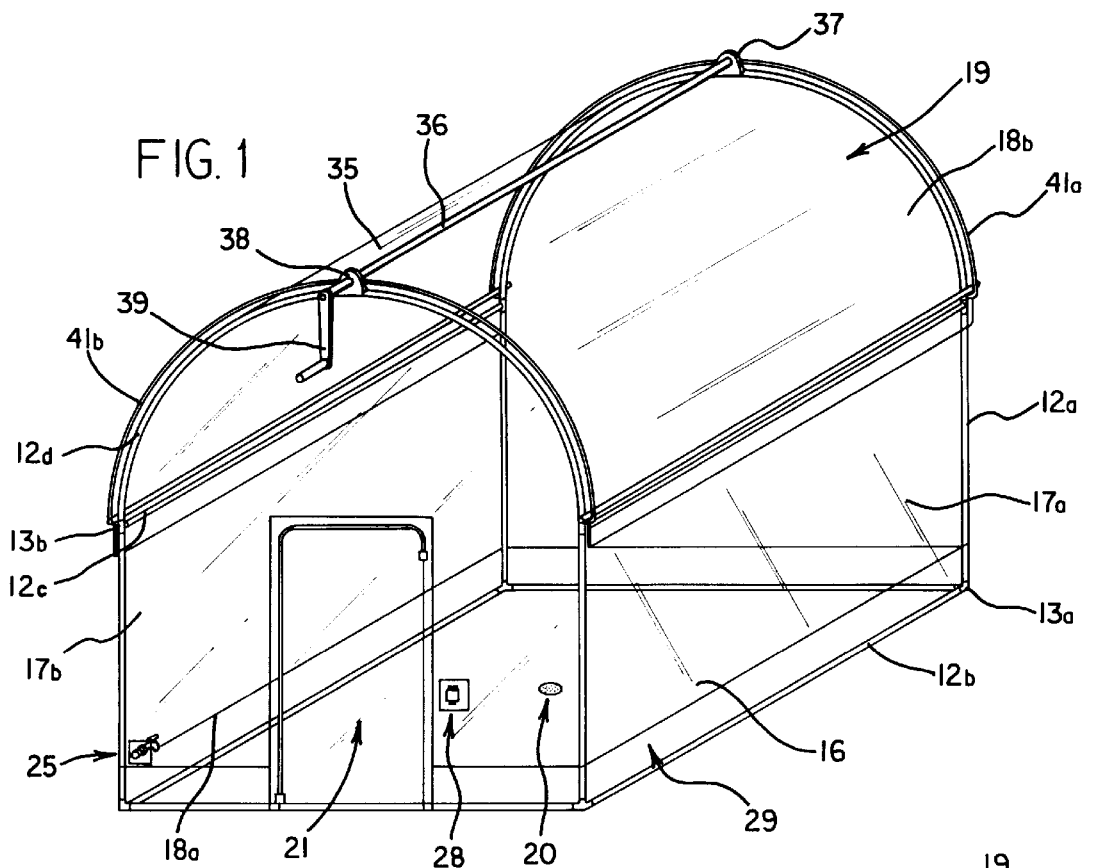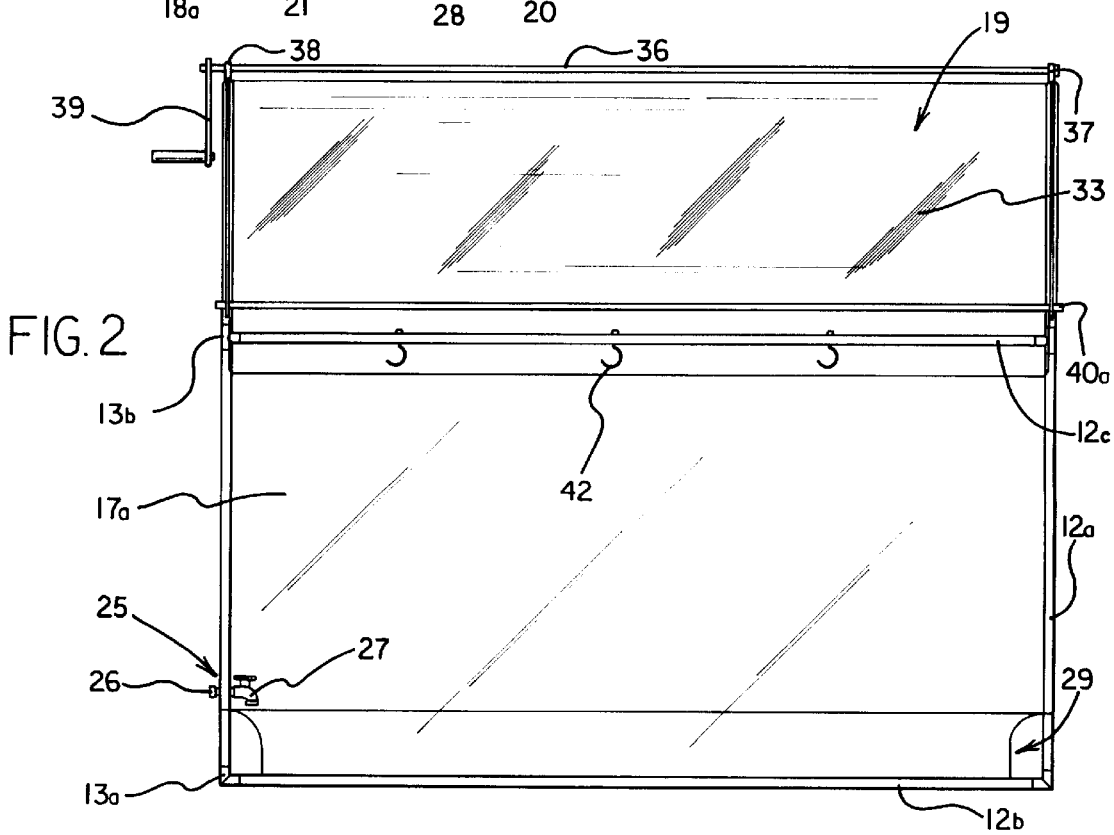

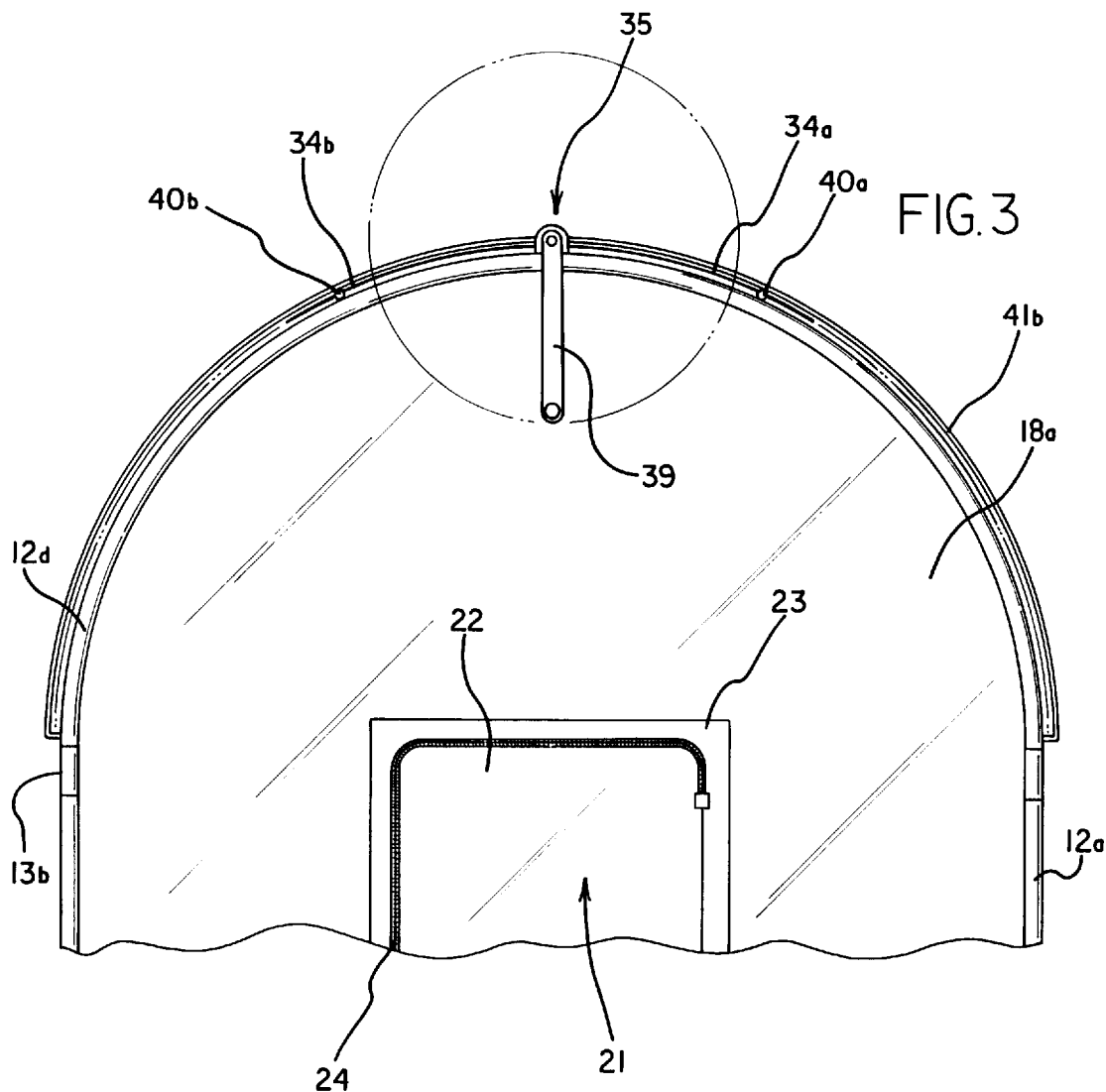
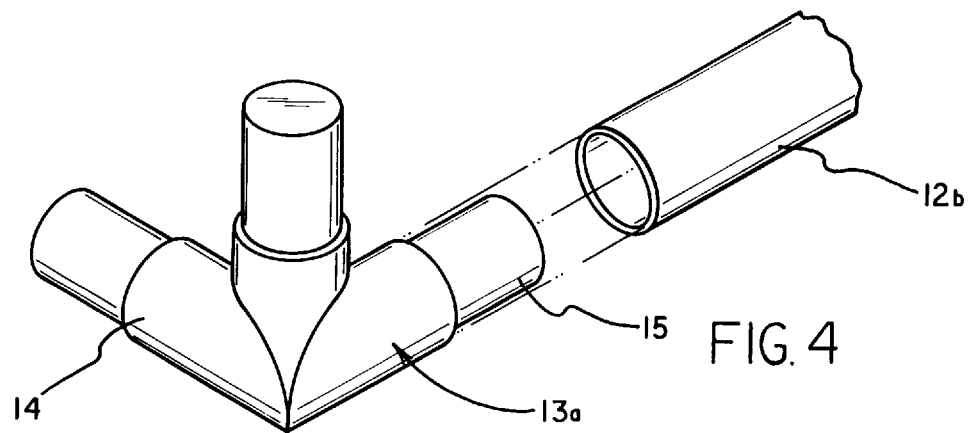

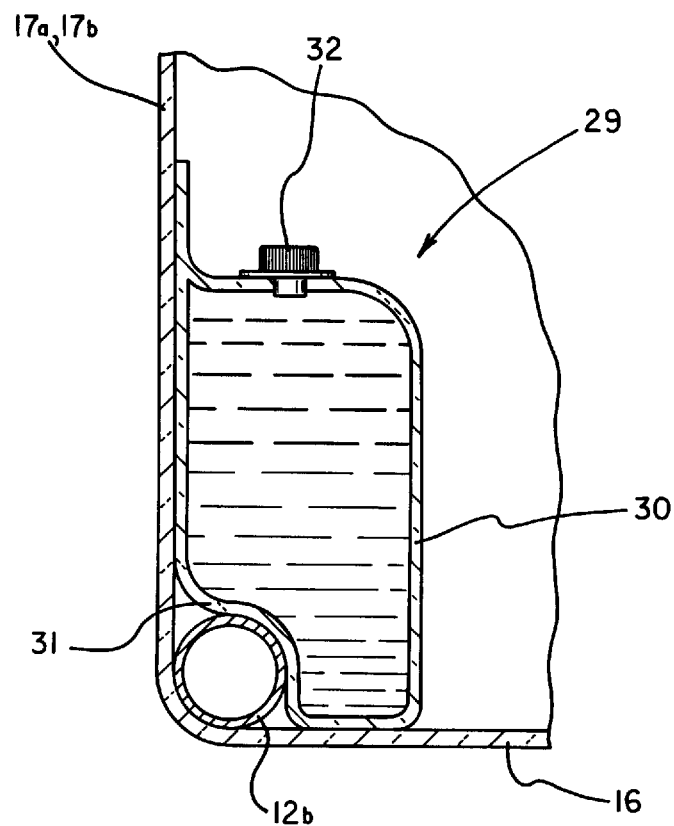
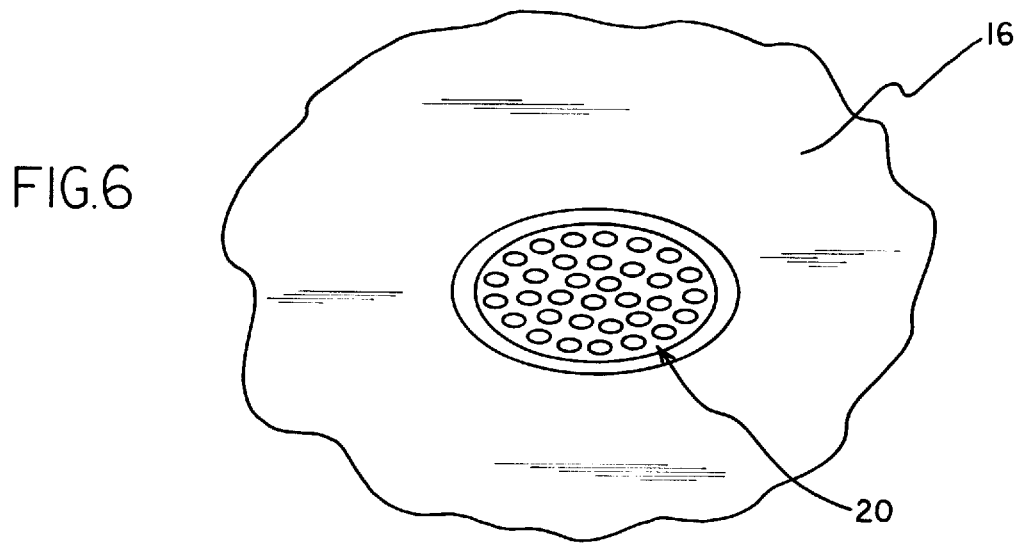

PORTABLE GREENHOUSE CONSTRUCTION

BACKGROUND OF THE INVENTION

1. Field of the Invention

The present invention relates to greenhouses and more particularly pertains to a new portable greenhouse construction for providing seasonal or year-round gardens.

2. Description of the Prior Art

The use of greenhouses is known in the prior art. More specifically, greenhouses heretofore devised and utilized are known to consist basically of familiar, expected and obvious structural configurations, notwithstanding the myriad of designs encompassed by the crowded prior art which have been developed for the fulfillment of countless objectives and requirements.

Known prior art greenhouses include U.S. Pat. No. 5,038,517; U.S. Pat. No. 4,051,626; U.S. Pat. No. 4,979,345; U.S. Pat. No. 4,167,838; U.S. Pat. No. 5,101,593; and U.S. Pat. No. 4,706,420.

While these devices fulfill their respective, particular objectives and requirements, the aforementioned patents do not disclose a new portable greenhouse construction. The inventive device includes a floor, side walls, end walls, and a roof defining an enclosure. Ballast containers are connected to the base of the end walls and side walls for stabilizing the greenhouse on the ground when filled with a ballast material, such as water. The roof is arch shaped and includes a pair of retractable, translucent covers which are rolled up onto a shaft to permit fresh air into the interior of the greenhouse through a mesh screen. Weighted rods are disposed at the edge of each cover to bias the covers to a position covering the mesh screen when the covers are unrolled from the shaft. The greenhouse includes an integral floor with a drain therein for draining moisture from the greenhouse.

In these respects, the portable greenhouse construction according to the present invention substantially departs from the conventional concepts and designs of the prior art, and in so doing provides an apparatus primarily developed for the purpose of providing seasonal or year round gardens.

SUMMARY OF THE INVENTION

In view of the foregoing disadvantages inherent in the known types of greenhouses now present in the prior art, the present invention provides a new portable greenhouse construction wherein the same can be utilized for providing seasonal or year round gardens.

The general purpose of the present invention, which will be described subsequently in greater detail, is to provide a new portable greenhouse apparatus and method which has many of the advantages of the greenhouses mentioned heretofore and many novel features that result in a new portable greenhouse construction which is not anticipated, rendered obvious, suggested, or even implied by any of the prior art greenhouses, either alone or in any combination thereof.

To attain this, the present invention generally comprises a floor, side walls, end walls, and a roof defining an enclosure. Ballast containers are connected to the base of the end walls and side walls for stabilizing the greenhouse on the ground when filled with a ballast material, such as water. The roof is arch shaped and includes a pair of retractable, translucent covers which are rolled up onto a shaft to permit fresh air into the interior of the greenhouse through a mesh screen. Weighted rods are disposed at the edge of each cover to bias the covers to a position covering the mesh screen when the covers are unrolled from the shaft. The greenhouse includes an integral floor with a drain therein for draining moisture from the greenhouse.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new portable greenhouse construction which has many of the advantages of the greenhouses mentioned heretofore and many novel features that result in a new portable greenhouse construction which is not anticipated, rendered obvious, suggested, or even implied by any of the prior art greenhouses, either alone or in any combination thereof.

It is another object of the present invention to provide a new portable greenhouse construction which may be easily and efficiently manufactured and marketed.

It is a further object of the present invention to provide a new portable greenhouse construction which is of a durable and reliable construction.

An even further object of the present invention is to provide a new portable greenhouse construction which is susceptible of a low cost of manufacture with regard to both materials and labor, and which accordingly is then susceptible of low prices of sale to the consuming public, thereby making such portable greenhouse construction economically available to the buying public.

Still yet another object of the present invention is to provide a new portable greenhouse construction which provides in the apparatuses and methods of the prior art some of the advantages thereof, while simultaneously overcoming some of the disadvantages normally associated therewith.

Still another object of the present invention is to provide a new portable greenhouse construction for providing seasonal or year round gardens.

Yet another object of the present invention is to provide a new portable greenhouse construction which includes a floor, side walls, end walls, and a roof defining an enclosure. Ballast containers are connected to the base of the end walls and side walls for stabilizing the greenhouse on the ground when filled with a ballast material, such as water. The roof is arch shaped and includes a pair of retractable, translucent covers which are rolled up onto a shaft to permit fresh air into the interior of the greenhouse through a mesh screen. Weighted rods are disposed at the edge of each cover to bias the covers to a position covering the mesh screen when the covers are unrolled from the shaft. The greenhouse includes an integral floor with a drain therein for draining moisture from the greenhouse.

Still yet another object of the present invention is to provide a new portable greenhouse construction that is easily constructed and broken down when not in use.

Even still another object of the present invention is to provide a new portable greenhouse construction that makes a greenhouse more accessible to anyone who wants a protected garden.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new portable greenhouse construction according to the present invention.

FIG. 2 is a side view of the greenhouse.

FIG. 3 is an end view of the upper portion of the greenhouse.

FIG. 4 is a view illustrating the connection between support frame members.

FIG. 5 is a partial sectional view of a corner of the greenhouse showing the ballast container.

FIG. 6 shows the drain in the floor of the greenhouse.

DESCRIPTION OF THE PREFERRED EMBODIMENT

With reference now to the drawings, and in particular to FIGS. 1 through 6 thereof, a new portable greenhouse construction embodying the principles and concepts of the present invention and generally designated by the reference numeral 10 will be described.

As best illustrated in FIGS. 1 through 6, the portable greenhouse construction 10 comprises a plurality of hollow tubes defining a frame for the greenhouse 10. The tubes include four vertical corner supports 12a, four horizontal base supports 12b, a pair of side, horizontal roof supports 12c, and a pair of end, arched roof supports 12d. The tubes 12a–d are made of a lightweight, high-strength material, such as aluminum, a glass fiber composite, or plastic material.

The tubes 12a–d are connected to each other at their junctions by connectors 13a, 13b. As illustrated in FIG. 4, the connectors 13a are configured for connecting tubes at the corners of the frame, and each connector 13a includes three orthogonally disposed members 14 with small diameter male members 15 projecting from the ends of the members 14 for disposition within the hollow tubes 12a,b. The diameter of the members 15 is slightly less than the inner diameter of the tubes 12a,b, so that a friction fit is obtained between the members 15 and the tubes 12a,b. The connectors 13b are similar to the connectors 13a, but two of the members 14 are parallel to each other. These type of connectors 13a,b are generally known in the prior art and are therefore not further discussed.

Extending between the tubes 12a–d are a floor 16, side walls 17a,b, end walls 18a,b, and a roof 19, to define a substantially enclosed interior space. The floor 16, as illustrated in FIGS. 1 and 6, includes a drain 20 formed therein for draining moisture from the interior of the greenhouse 10. The floor 16 is made from a rigid plastic material to give the greenhouse a solid base. The side walls 17a,b and end walls 18a,b are made of a heavy duty, translucent plastic material, preferably about 6 mil or thicker plastic material.

The end wall 18a includes a door 21 formed therein for permitting access to the interior of the greenhouse 10. The door 21 is made of a fabric material and comprises a panel 22 connected to a frame 23 which is secured within the end wall 18a. The panel 22 is secured to the frame 23 along two entire edges and partially along a third edge thereof by a conventional zipper-type connection 24. By unzipping the panel along its edges, the panel can be moved aside in order to allow entry to the interior. A zippered mesh screen similar to the door 21 is disposed inside of the door 21 and connected to the end wall 18a. The zippered screen functions similarly to the door 21 and must also be unzipped in order to enter the interior. The zippered screen is normally kept zipped while the door 21 is open, in order to permit fresh air to enter the interior while keeping out insects and foreign matter.

The end wall 18a also includes a water connection means 25 therein. The water connection means 25 includes a hose connection end 26 for connecting with a conventional garden hose, and a water faucet end 27 for controlling the flow of water into the interior when a hose is attached. Thus, by connecting a hose to the end 26, water can be supplied to the interior of the greenhouse. An inside hose can then be connected to the faucet end 27 in order to distribute water within the greenhouse. An electrical connection means 28 is also provided in the end wall 18a, which connects with a source of electricity, such as from an extension cord, and includes an inside plug-in so as to provide electricity to the inside of the greenhouse.

In order to firmly anchor and stabilize the greenhouse on the ground, ballast means 29 are connected to the base ends of the side wall 17a,b and end walls 18a,b. As best illustrated in FIG. 5, the ballast means 29 comprise enclosed containers 30 made of a rigid, lightweight plastic material. The containers 30 are connected along one side to the side walls 17a,b and end walls 18a,b, and are connected along an additional side to the floor 16, such as by adhesives or other suitable means. As shown, one corner 31 of the container is arched to accommodate the tubes 12b, and access to the interior of the containers is controlled by a removable cap 32. The containers 30 on each of the side walls and end walls can either be completely separate from each other so that a cap 32 is provided for each container, or they can be in communication with each other so that only a single cap need be provided. In either case, upon assembly of the greenhouse, the containers 30 are filled with a suitable ballast material, such as water. The weight of the water at the base of the structure stabilizes the greenhouse and prevents the structure from being easily moved, such as by the wind blowing on the structure.

The roof 19 is generally arch-shaped to match the arch-shape of the tubes 12d. The roof 19 comprises an inner mesh screen 33 extending between and connected to the tubes 12c, 12d, covered by a pair of retractable, translucent, flexible covers 34a,b, preferably of a plastic sheeting material. Each cover 34a,b preferably encompasses approximately one-half of the arch of the roof.

A retraction means 35 is provided in order to actuate the covers between a cover position, where the covers are each disposed over the screen 33 and completely cover the roof, and an open position, where the covers do not cover the screen 33 permitting fresh air to enter the greenhouse. The retraction means 35 comprises a rod or drum 36 at the apex of the arched roof 19 and rotationally supported at its ends by supports 37,38 which are secured to the tubes 12d. The covers 34a,b are connected along their top edges to diametrically opposite sides of the rod 36, such that when the rod 36 is rotated, the covers are wound onto, or from, the rod. The rod 36 extends through the support 38 and is connected to a crank 39 for rotating the rod 36. The edges of the covers 34a,b, opposite to the edges connected to the rod, are affixed to weighted rods 40a,b. The rods 40a,b are slightly longer than the edges of the covers so that they extend beyond the covers at each end and into engagement with track members 41a,b. The track members 41a,b are secured to the tubes 12d, such as by welding when the tubes are aluminum, and permit the weighted rods 40a,b to slide up and down along the tracks when the rod 36 is rotated. Thus, if the covers are in an initial cover position, turning the crank causes the rod to rotate which winds the covers onto the rod to the open position, as shown in FIG. 3. The weighted rods will slide along the tracks during this process, to maintain the alignment of the covers. Reversing the direction of rotation will cause the covers to unwind from the rod. The weight of the rods 40a,b will bias the edges of the covers downward to the cover position.

The interior of the greenhouse 10 can be provided with a series of irrigation tubes having holes to permit distribution of water within the structure for irrigating plants therewith in. Alternatively, the tubes 12a–d could be provided with suitably located holes and connected with a supply a water to provide for irrigation of the plants. Certain ones of the tubes, such as the tubes 12c, can have hooks 42 connected thereto permitting hanging of utility items such as shovels, spades, gloves, etc.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable greenhouse construction, comprising:

a floor;

side walls being connected at a base end of said side walls to the floor, said side walls extending upwardly from the floor;

end walls being connected at a base end of said end walls to the floor, the end walls extending upwardly from the floor;

a roof extending between the side walls and end walls, said roof comprising:

a pair of translucent flexible roof panels for selectively covering said interior space, said flexible roof panels each having opposite side edges, said side edges including an inner edge and another edge, each of said roof panels extending between a half of the arcuate top edge, said end walls being for covering an opposite side of said interior space, said flexible panels meeting at the uppermost vertical top of the arcuate top edge;

an actuator rod extending between the end walls and being positioned at the vertical top of the arcuate top edge of the end walls, the inner edge of each of said roof panels being coupled to the actuator rod such that rotation of said actuator rod wraps said flexible roof panels about said rod to expose the interior space without moving said side walls out of position;

each roof panel further having a respective weight member coupled to the outer edge of each said roof panel opposite said actuator rod, said weight members being for biasing said respective roof panels into a closed position covering said interior space;

the floor, side walls, end walls, and roof defining an interior space;

the side walls, the end walls, and the roof being made from a translucent material; and ballast means connected to the base end of each of the side walls and the end walls to stabilize the greenhouse on the ground.

2. The portable greenhouse construction of claim 1, wherein said ballast means comprises an enclosed container connected to an inside surface of each of the side walls and the end walls at the base ends thereof for being filled with a ballast material.

3. The portable greenhouse construction of claim 2, wherein each enclosed container includes access means thereon permitting access to the interior of the container for adding and removing the ballast material.

4. The portable greenhouse construction of claim 1, wherein said roof comprises an arch shaped support frame and a pair of retractable, translucent, flexible covers supported by the frame, said covers being moveable between cover and open positions.

5. The portable greenhouse construction of claim 4, wherein said roof further comprises a mesh screen supported by the frame and underlying the roof covers.

6. The portable greenhouse construction of claim 4, further including means for actuating the roof covers for movement between the cover and open positions, said actuating means comprising a shaft connected to one edge of each cover and a crank handle connected to the shaft for rotating the shaft so as to wind and unwind the roof covers onto and from the shaft.

7. The portable greenhouse construction of claim 6, further including a weighted rod at an edge of each of the covers opposite the one edge, each rod including a pair of ends sliding within respective track means connected to the support frame for guiding the movements of the roof covers between the cover and open positions.

8. The portable greenhouse construction of claim 1, wherein the floor includes a drain means formed therein for draining moisture from the interior of the greenhouse.

9. The portable greenhouse construction of claim 1, wherein one of said end walls includes a door formed therein, said door including a zipper operatively connected thereto for opening and closing the door.

10. The portable greenhouse construction of claim 1, further including a zippered screen, said zippered screen being attached to said one end wall adjacent the door on an interior side of said door.

11. The portable greenhouse construction of claim 1, further including a water connection means for providing a water source accessible from said interior space, said water connection means being formed in one of said end walls.

12. The portable greenhouse construction of claim 1, further including an electrical connection means for providing an electrical power source accessible from said interior space, said electrical connection means being formed in one of said end walls.

13. A portable greenhouse construction comprising:

a pair of substantially vertical translucent end walls, each of said pair of end walls having a base and an arcuate top edge;

a pair of substantially vertical translucent side walls, each of said side walls being substantially rectangular, each of said pair of side walls having a base, each of said side walls being positioned between said pair of end walls to form an interior space;

a floor, said floor being connected to each of said pair of side walls at said base of each of said pair of side walls, said floor further being connected to each of said pair of end walls at said base of each of said pair of end walls;

a pair of translucent flexible roof panels for selectively covering said interior space, said flexible roof panels each having opposite side edges, said side edges including an inner edge and another edge, each of said roof panels extending between a half of the arcuate top edge, said end walls being for covering an opposite side of said interior space, said flexible panels meeting at the uppermost vertical top of the arcuate top edge;

an actuator rod extending between the end walls and being positioned at the vertical top of the arcuate top edge of the end walls, the inner edge of each of said roof panels being coupled to the actuator rod such that rotation of said actuator rod wraps said flexible roof panels about said rod to expose the interior space without moving said side walls out or position;

each roof panel further having a respective weight member coupled to the outer edge of each said roof panel opposite said actuator rod, said weight members being for biasing said respective roof panels into a closed position covering said interior space;

a tracking means for guiding each weight member, said tracking means being positioned along said arcuate top edge of each of said pair of end walls, wherein each weight member has opposite ends, said opposite ends being slidably positioned within said track means;

wherein one of said pair of end walls includes a water valve extending through said one of said pair of end walls, said water valve being adapted to receive a hose on an outer side of said water valve, said water valve further having a means for opening said water valve, said means for opening said water valve being positioned within said interior space;

wherein one of said pair of end walls includes an electrical connector extending through said one of said pair of end walls, said electrical connector being adapted to receive an electrical cord from a power source on an outer side of said electrical connector, said electrical connector further having an outlet for providing a power source to said interior space;

wherein one of said pair of end walls includes an inverted L-shaped zippered slot to form a doorway into said interior space; and a frame positioned within said interior space, said frame structured to extend along an outer perimeter of each of said pair of side walls and each of said pair of end walls.

14. The portable greenhouse construction of claim 13, further comprising:

a ballast means for anchoring said greenhouse construction, said ballast means being positioned along said base of each of said pair of side walls and along said base of one of said pair of end walls not having said doorway, said ballast means extending outwardly from said door along said base of said one of said pair of end walls having said door such that said doorway is not obstructed by said ballast means.

15. The portable greenhouse construction of claim 14 wherein said ballast means includes an opening for filling said ballast means with a weighting material.

16. The portable greenhouse construction of claim 13, further comprising:

a top mesh screen covering said interior space, said top mesh screen being supported by said frame; and an inner mesh screen coupled to said one of said pair of end walls having said doorway, said inner mesh screen positioned to cover said doorway, said inner mesh screen having a zippered inverted L-shaped opening such that said inner mesh screen is openable to permit access to said interior space.

17. The portable greenhouse construction of claim 13, wherein said actuator includes a crank handle for moving said roof members between said open position and said closed position.

* * * * *